United States Patent [19]
McCorkel et al.

[11] Patent Number: 5,779,536
[45] Date of Patent: Jul. 14, 1998

[54] TRUCK CAB VENTILATION SYSTEM AND METHOD

[75] Inventors: Joseph H. McCorkel; Terry J. Urban, both of Vancouver, Wash.

[73] Assignee: Freightliner Corporation, Portland, Oreg.

[21] Appl. No.: 631,171

[22] Filed: Apr. 12, 1996

[51] Int. Cl.$^6$ ..................................... B60H 1/26
[52] U.S. Cl. ................. 454/137; 454/141; 454/165
[58] Field of Search .................. 454/137, 141, 454/162, 165

[56] References Cited

U.S. PATENT DOCUMENTS

| | | | |
|---|---|---|---|
| 1,618,152 | 2/1927 | Hutchins | 454/141 X |
| 4,640,184 | 2/1987 | Matsushima et al. | 454/137 |
| 5,040,455 | 8/1991 | Doi et al. | 454/162 X |
| 5,105,731 | 4/1992 | Kraus | 454/165 X |
| 5,205,782 | 4/1993 | Ohba | 454/141 |

FOREIGN PATENT DOCUMENTS

| | | | |
|---|---|---|---|
| 32 40 291 | 5/1984 | Germany | 454/165 |
| 35 33 047 | 3/1987 | Germany | 454/137 |
| 36 44 566 | 7/1988 | Germany | 454/137 |
| 3-248910 | 11/1991 | Japan | 454/137 |
| 2 124 751 | 2/1984 | United Kingdom | 454/137 |

OTHER PUBLICATIONS

"Passenger Car Ventilation by Design" by K. Wilfert and H. Goetz, Society of Automotive Engineers, Inc., Mid–Year Meeting, Chicago, Illinois, May 17–21, 1965, pp. 1–6.

Freightliner Corporation drawing entitled "Vent–Exhauster" for a 68811 HVAC TRW body pressure relief vent (in German–without translation), showing prior art vent in drawing dated Sep. 22, 1988.

*Primary Examiner*—Harold Joyce
*Attorney, Agent, or Firm*—Klarquist Sparkman Campbell Leigh and Whinston LLP

[57] ABSTRACT

A truck cab ventilation system and method which includes an air exhaust channel that extends from an upper channel portion adjacent the ceiling at the rear of the cab and through a lower channel portion to an exhaust vent mounted adjacent the floor of the cab over an exit opening in such floor. An inlet vent in the front of the cab produces a positive pressure within the cab which causes flow-through ventilation air flow from the front to the rear of the cab when the truck is moving. As a result, air flows into the upper channel portion of the exhaust channel and out of the exhaust vent through the exit opening to the exterior of the cab. The exhaust vent includes flexible louvers of elastomer which are held by gravity in a closed position and are moved into an open position when air flows out through the exhaust system.

11 Claims, 6 Drawing Sheets

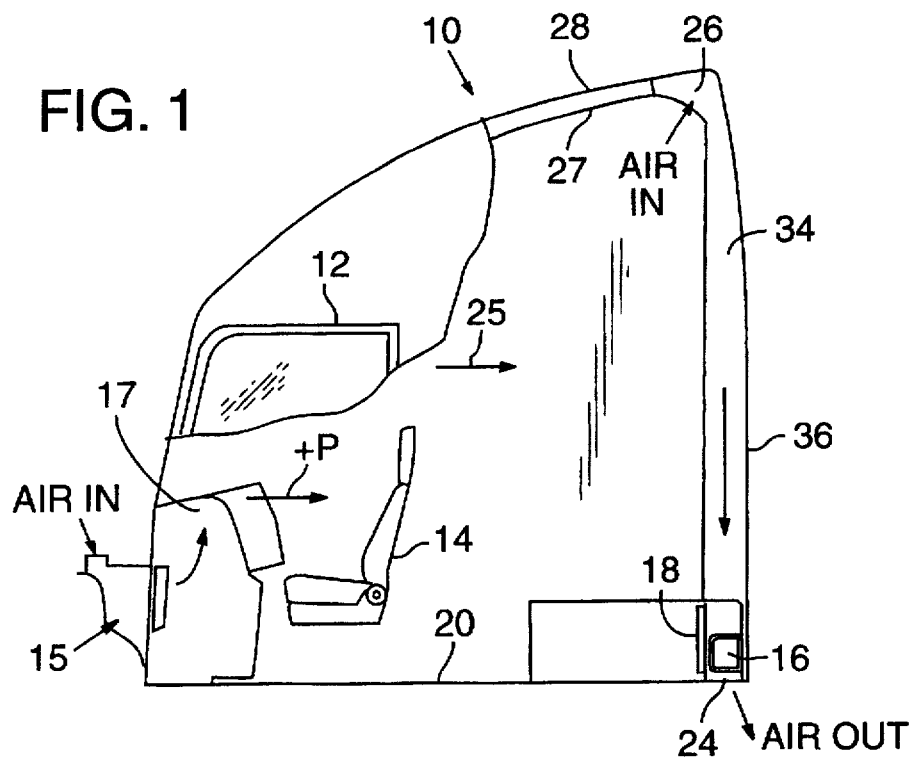
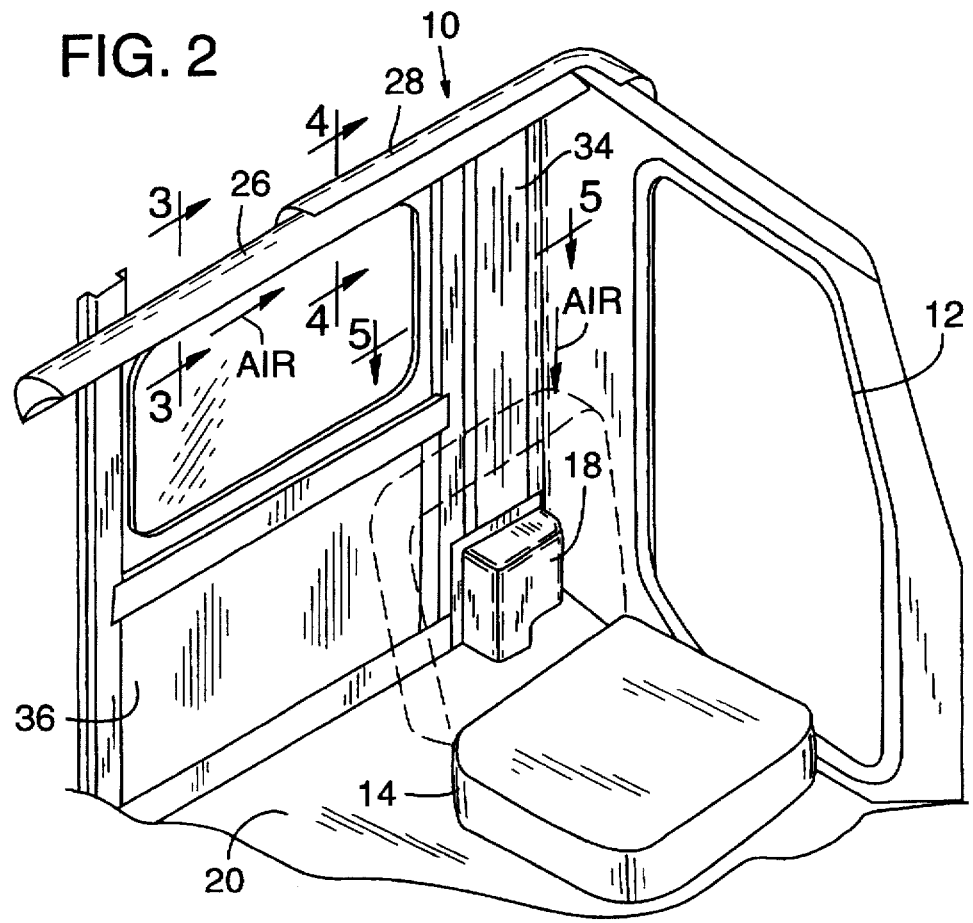

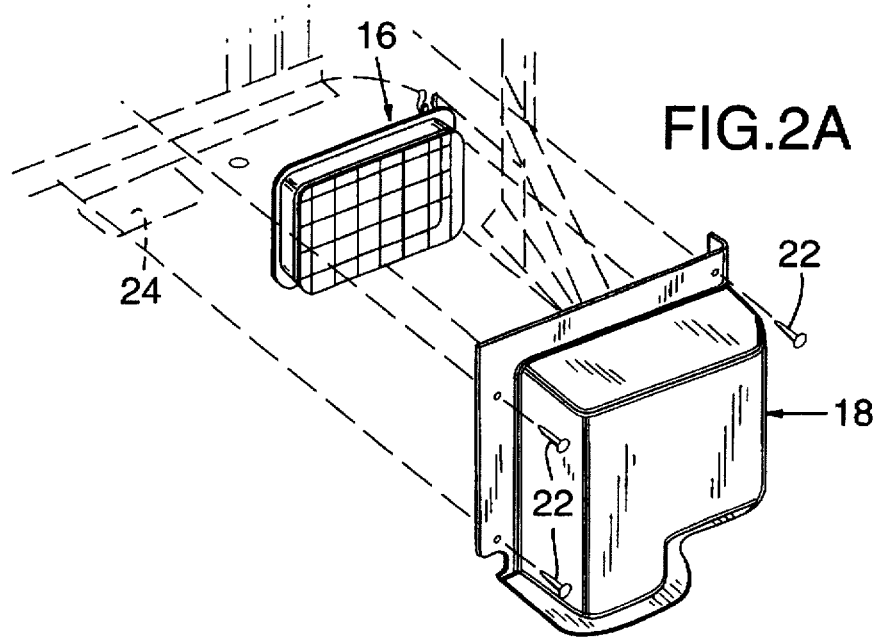
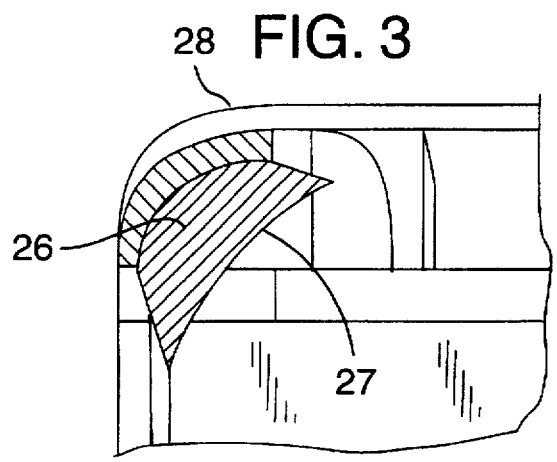
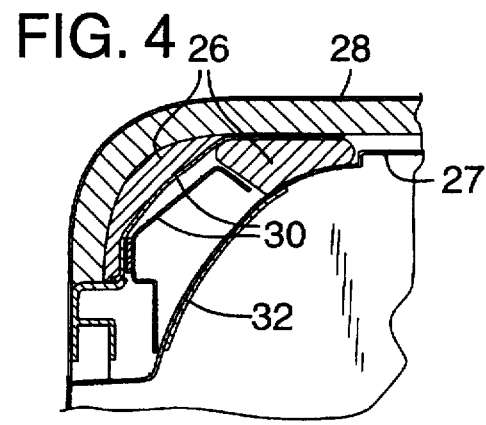
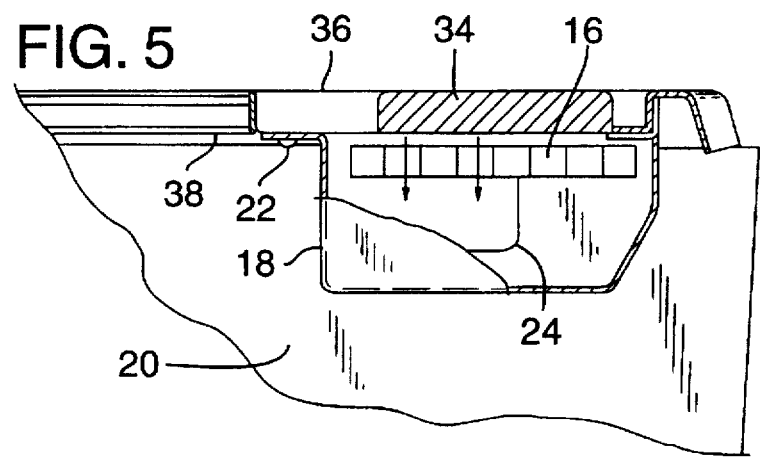

TRUCK CAB VENTILATION SYSTEM AND METHOD

FIELD OF THE INVENTION

The present invention relates generally to truck cab ventilation, in particular, to a truck cab ventilation system and method which transmits air through an air channel from an upper region adjacent the ceiling of the cab, downward to an exhaust vent adjacent the floor of the cab, for discharging the air from the cab. The exhaust vent may discharge the air through an exit opening in the floor or back wall of the cab. The truck cab exhaust ventilation system of the present invention is preferably a passive system containing no fan. However, the truck cab also may contain an air inlet as part of a flow-through ventilation system which produces a positive pressure within the truck cab that causes air to flow from the front to the rear of the cab. This also causes air to flow in the exhaust ventilation system through the channel downward from the ceiling to the exhaust vent at the floor or back wall of the cab and out through an exit opening. While the air channel may be provided by a separate air conduit within the cab, it is preferably formed by employing the existing cab wall members, including the head liner and carpeting covering such cab members.

BACKGROUND OF THE INVENTION

It has previously been disclosed in the article, "Passenger Car Ventilation By Design," by Karl Wilfert, et al., published at the May 17, 1965 meeting of the Society of Automotive Engineers, to provide an automobile with a flow-through ventilation system, including an air inlet adjacent the windshield. This ventilation system depends upon dynamic pressure created by movement of the automobile. However, in this system, the air flow is from the front to the rear of the automobile, and is discharged through exit openings adjacent the rear window or trunk of the automobile. Thus, there is no disclosure in this article of a truck cab ventilation system in which air adjacent the ceiling of the truck cab is transmitted through a channel downward, to an exhaust vent positioned adjacent the floor of the cab, and discharged through an exit opening in the floor of the cab to the exterior of the truck cab in the manner of the present invention.

The exhaust vent employed in the ventilation system of the present invention employs movable louvers which are moved by air flow from a closed position to an open position, and which are normally held in a closed position by gravity, such louvers being preferably made of flexible elastomer material.

The truck cab exhaust ventilation system of the present invention has the advantage of automatically removing stale or hot air from the interior of the truck cab and exhausting such hot air to the exterior of the cab through an exhaust vent adjacent the floor of the cab. As a result, the driver in the truck cab can keep the cab windows closed to reduce wind noise and keep dust and other air contaminants from entering the truck cab. A positive air pressure is produced within the truck cab by the air inlet of a flow-through ventilation system in addition to such exhaust system. This positive air pressure causes air to flow through the exhaust ventilation system in an air flow channel extending from an upper portion adjacent the ceiling of the truck cab, down through a vertical portion to the exhaust vent positioned adjacent the floor of the truck cab, and discharged through an exit opening in the floor. As a result, hot air normally trapped adjacent the ceiling of the cab will be exhausted through such a vent to the exterior of the cab.

SUMMARY OF THE INVENTION

It is, therefore, one object of the present invention to provide a truck cab ventilation system which is simple and inexpensive, and which efficiently removes air from the truck cab and exhausts it to the exterior of the cab.

Another object of the invention is to provide such a truck cab exhaust ventilation system in which the air flow is directed by a channel extending from an upper region adjacent the ceiling of a truck cab to an exhaust vent positioned in the truck cab.

A further object of the present invention is to provide such a truck cab exhaust ventilation system in which an exhaust vent is employed having movable louvers which are normally held in a closed position by gravity, and are opened by air flowing through such exhaust vent to the exterior of the cab.

An additional object of the present invention is to provide such a truck cab exhaust ventilation system in which the exhaust vent exhausts the air through an exit opening in the floor or back wall of the cab.

Still another object of the present invention is to provide a method of exhaust ventilation of the truck cab which operates in an efficient manner to withdraw air from an upper position adjacent the ceiling of the truck cab and transmits the air downward from the ceiling through a channel to an exhaust vent adjacent the floor of the cab where such air is exhausted to the exterior of the cab in an efficient manner.

A still further object of the invention is to provide a truck cab with a flow-through ventilation system to produce a positive air pressure within the cab, that causes air to flow through such exhaust ventilation system.

BRIEF DESCRIPTION OF THE DRAWINGS

Other objects and advantages of the present invention will be apparent from the following detailed description of a preferred embodiment thereof, and from the attached drawings of which:

FIG. 1 is a diagrammatic view of a truck cab ventilation system in accordance with the invention, including an air inlet providing flow-through ventilation and an exhaust vent outlet forming part of an exhaust ventilation system.

FIG. 2 is an oblique partial view of the interior of a truck cab, with parts broken away to show a truck cab exhaust ventilation system in accordance with one embodiment of the present invention;

FIG. 2A is a partially exploded view of the ventilation system of FIG. 2, showing the mounting of the exhaust vent within a vent cover over an exit opening in the floor of the truck cab;

FIG. 3 is an enlarged section view taken along the line 3—3 of FIG. 2;

FIG. 4 is an enlarged section view taken along the line 4—4 of FIG. 2, showing the upper portion of an air flow channel adjacent the ceiling of the truck cab;

FIG. 5 is a horizontal section view taken along the line 5—5 of FIG. 2, showing the lower portion of the air flow channel as it directs air through the exhaust vent through the exit opening in the floor of the truck cab;

DETAILED DESCRIPTION OF THE PREFERRED EMBODIMENTS

Figure 6:
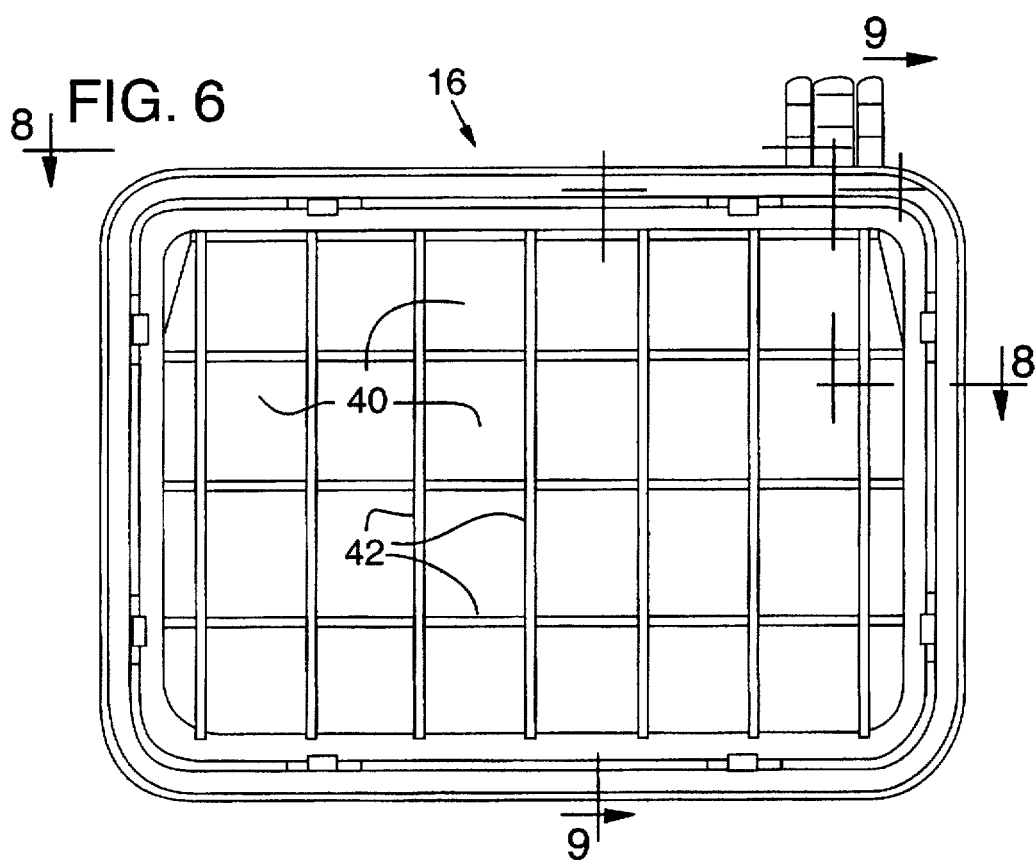
FIG. 6 is an enlarged view of the outlet side of the exhaust vent of FIG. 2A.
Figure 7:
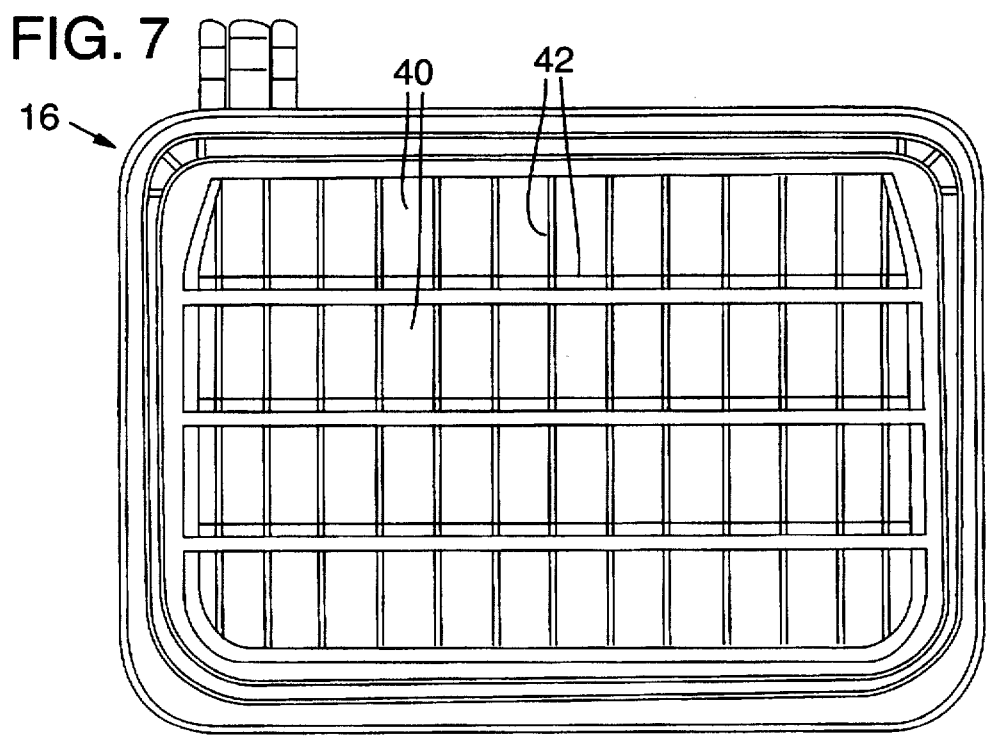
FIG. 7 is an enlarged view of the inlet side of the exhaust vent of FIG. 6.
Figure 8:
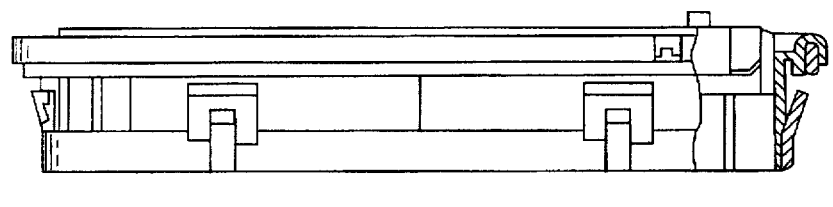
FIG. 8 is a top plan view of the exhaust vent of FIG. 6.
Figure 9:
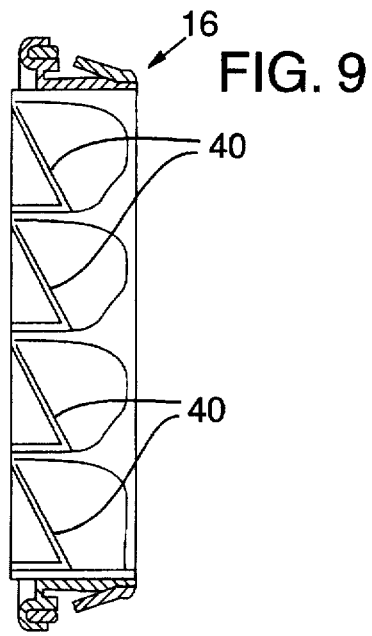
FIG. 9 is a vertical section view taken along the line 9—9 of FIG. 6, showing the air louvers of the exhaust vent.

As shown in FIG. 1, a truck ventilation system in accordance with the present invention includes a truck cab 10 with a driver's side door 12 and a driver's seat 14. An air inlet vent 15 is provided at the front of the cab on the dashboard 17 and an air exhaust vent 16 contained within a housing 18 is mounted adjacent the floor 20 of such cab in a position behind the driver's seat 14. As shown in FIGS. 2 and 2A, the exhaust vent 16 is mounted in a vertical position within the housing 18, and such housing is bolted on the back wall of the truck cab by bolts or screws 22 in position so that the housing directs the air through an exit opening 24 in the floor of the truck cab. As a result of movement of the truck cab, air flows through air inlet 15, and a positive air pressure region is produced in the front of the cab adjacent the dashboard, which causes flowthrough ventilation air flow in the direction of arrow 25 from the front to the rear of the cab.

An exhaust ventilation system is provided at the rear of the truck cab by the exhaust vent 16, and an air path channel, including an upper horizontal portion 26 located adjacent the ceiling 27 of the truck cab below the roof 28 of such cab as shown in FIGS. 1–5. The upper channel portion 26 is formed between the outer wall and roof of the truck cab and ceiling 27 and inner support members 30. As shown in FIG. 4, the inner support members 30 are spaced from the outer wall to provide the air channel beneath the head liner 32 of the truck cab. The upper channel portion 26 extends horizontally along the rear edge of the cab ceiling 27, and joins a vertical channel portion 34, which extends downward from such upper channel along the back wall of the truck cab to the exhaust vent housing 18. As shown in FIG. 5, the vertical channel portion 34 is formed between the outer wall of the rear end 36 of the truck cab and the inner wall 38 of such rear end. As shown in FIG. 2, hot air flows in the upper channel portion 26 from left to right and than downward in the vertical channel portion 34 to the exhaust vent 16 adjacent the floor of the truck cab. The air flows horizontally through the exhaust vent and down through the exit opening 24 in the floor of the truck cab to the exterior of such cab as shown in FIG. 5. However, the exhaust vent 16 and the exit opening 24 can instead be positioned on the back wall 36 of the cab adjacent the ceiling 37 or the floor 20 of the cab. The cross section area of the channel portions 26 and 34 are provided with a minimum cross-sectional area of approximately 14 square inches for proper air flow.

Figure 10:
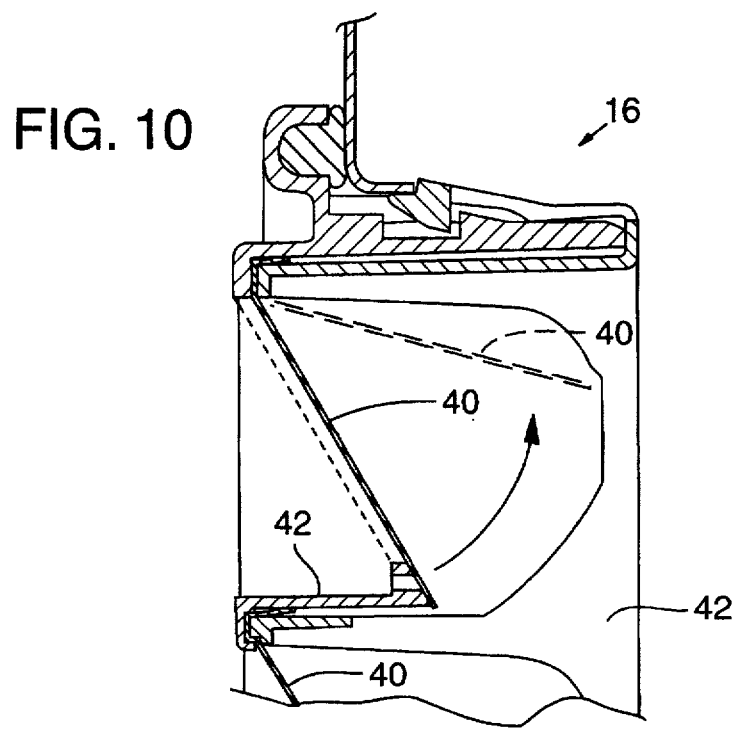
FIG. 10 is an enlarged view of a portion of FIG. 9, showing the louvers in a closed position in solid lines and in an open position in dashed lines.

As shown in FIGS. 6–10, the exhaust vent 16 may be provided with a plurality of flexible louvers 40, which move between a closed position shown in solid lines, and an open position shown in dashed lines, in FIG. 10, when air flows through the channels 26, 34 and out of such vent. However, in the closed position of the louvers, shown in FIG. 11, the louvers are held by gravity against rigid vent frame members 42 to prevent air from flowing back into the cab through such vent, such as when the ventilation system is turned off in cold weather. The louvers 40 may be made of rubber or other flexible elastomer material, and are of sufficient weight so that gravity holds the louvers in the closed position.

Figure 11:
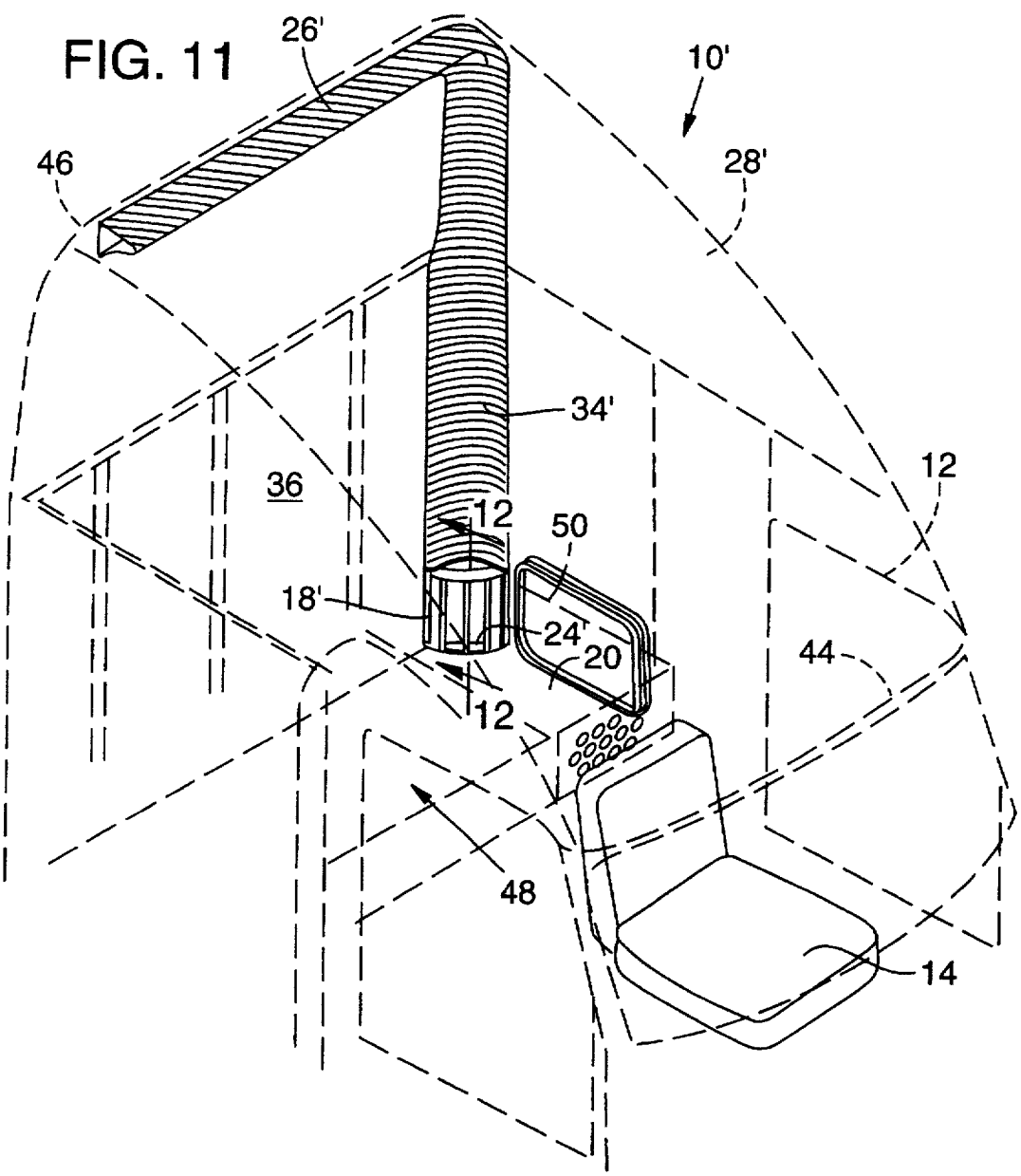
FIG. 11 is an oblique view of a truck cab with a raised roof employing another embodiment of the exhaust ventilation system of the present invention.
Figure 12:
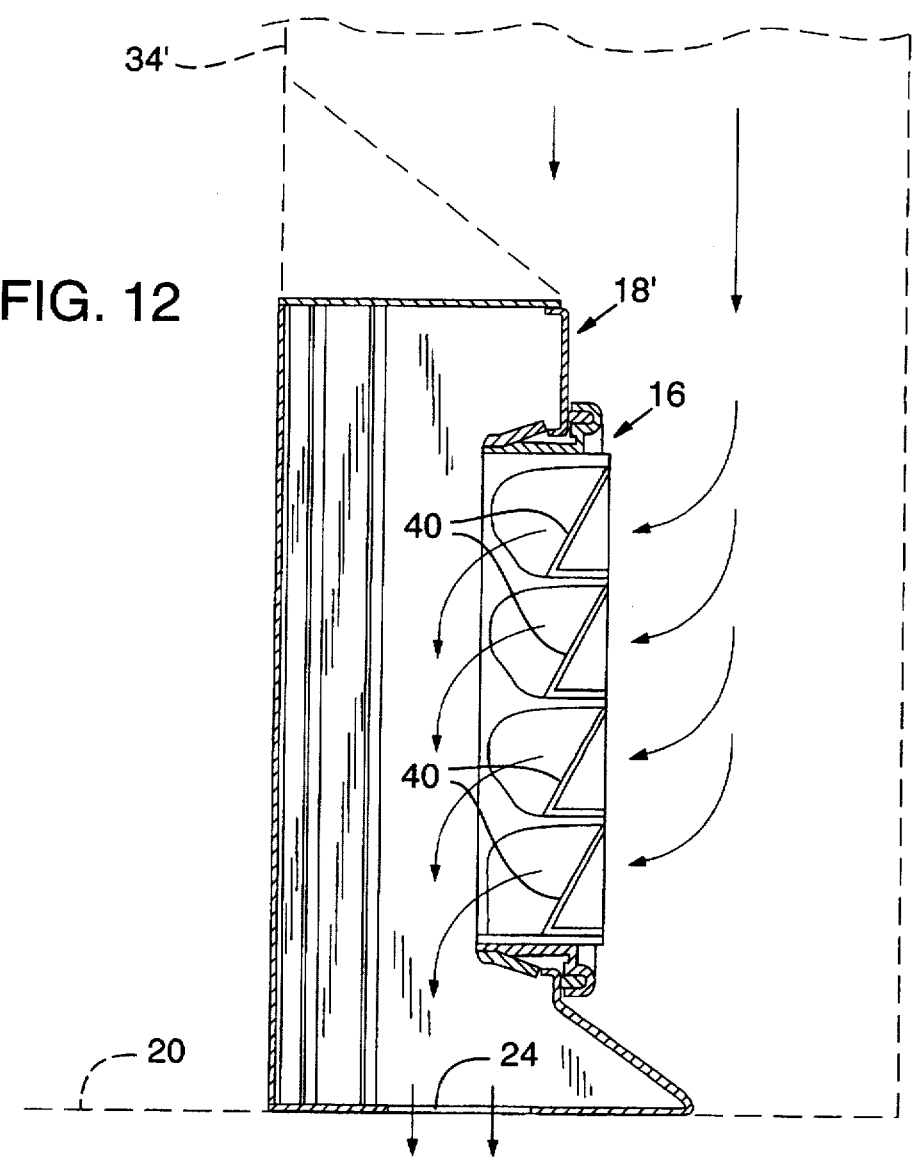
FIG. 12 is an enlarged vertical section view taken along the line 12—12 of FIG. 11.
Figure 13:
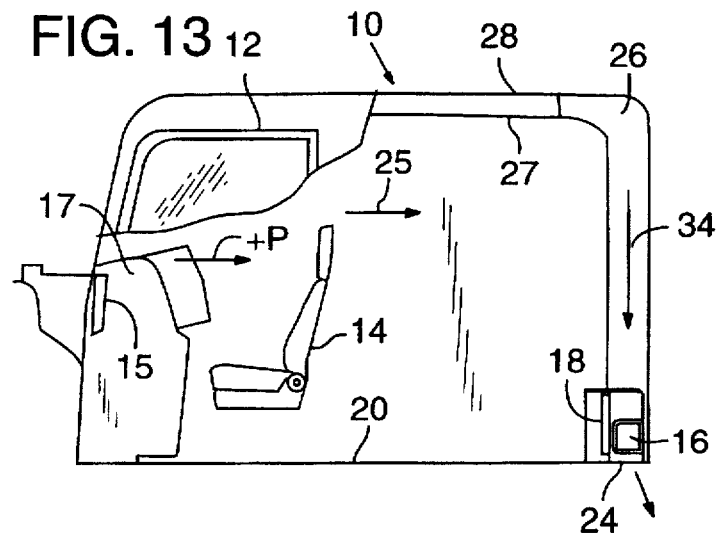
FIG. 13 is a diagrammatic view of a truck cab ventilation system in accordance with an embodiment of the invention of a truck cab without a raised roof.

Another embodiment of the truck cab ventilation system of the present invention is show in FIG. 11 for a truck cab having a raised roof 28' which slopes upward from its front edge 44 to its rear edge 46. The upper channel portion 26' of the air flow channel is positioned adjacent the ceiling beneath the rear edge 46 of the roof, and is connected to the vertical channel portion 34'. The vertical channel portion is positioned in the corner between the rear 36 of the truck and the driver's side of the truck, and extends downward to vent housing 18' adjacent the floor 20 behind the driver's seat 14. The exhaust vent 16' is positioned between the outlet of the channel portion 34' and the exit opening 24, for exhausting the air transmitted from the upper channel portion 26' through the vent and exit opening 24', as shown in FIG. 12, in a similar manner to the embodiment of FIGS. 1 and 2. It should be noted that a sleeping bunk 48 may be provided behind the driver's seat 14 in the raised roof cab 10' of FIG. 11 on a platform support 50 raised above the floor 20 to the top of housing 18', so that the exhaust vent 16' is positioned below the top of such bunk.

As in the embodiment of FIGS. 1 and 2, the raised roof cab 10' of FIG. 11 provides the air flow channel portions 26' and 34' at least in part from the existing inner wall support members beneath the head liner of the roof and the carpeting over the rear end inner wall.

It will be obvious to those having ordinary skill in the art that many changes may be made in the above-described preferred embodiments of the present invention. Therefore, the scope of the present invention should be determined by the following claims.

I claim:

1. A truck cab exhaust ventilation system, comprising:
   an exhaust vent;
   vent mounting means for mounting the exhaust vent within a truck cab for exhausting air from the interior to the exterior of the truck cab;
   an air flow channel adapted to be connected to said vent at the outlet end of said channel; and
   an elongated air collection inlet completely within the truck cab extending transversely of the truck cab including an upper portion of the channel adjacent the ceiling of said cab to remove stale air from the cab through said channel and said vent.

2. A ventilation system in accordance with claim 1 in which the upper channel portion is positioned in a corner of the truck cab formed between the ceiling and the rear wall of the cab and the exhaust vent is contained in a housing mounted on the cab over an exit opening extending through the cab.

3. A ventilation system in accordance with claim 1 which also includes an air inlet adapted to be mounted in said cab to provide a positive pressure within the cab for causing air to move from front to rear of the cab and through said channel and said vent to provide flow-through ventilation.

4. A ventilation system in accordance with claim 1 in which the exhaust vent has movable louvers which can be moved between an open position and a closed position.

5. A ventilation system in accordance with claim 4, including an air flow channel portion connected to the exhaust vent for moving the louvers from said closed position to said open position by air flow.

6. A ventilation system in accordance with claim 4 in which the vent is mounted in a position so that the louvers are moved by gravity into said closed position.

7. A ventilation system in accordance with claim 6 in which the louvers are made of flexible elastomer material.

8. A ventilation system in accordance with claim 1 in which the channel includes a lower portion which is connected to said upper portion and is adapted to be positioned in the truck cab at the rear corner of the cab formed between a rear wall and a side wall of the cab.

9. A method of exhaust ventilation of a truck cab, comprising the steps of:

withdrawing stale air from an upper position adjacent the ceiling of the truck cab through an air collection inlet channel portion within the truck cab extending transversely of the cab;

transmitting the air from the ceiling through a lower channel portion downward to an exhaust vent at a lower position in said cab; and exhausting the air from the interior to the exterior of the cab through said vent.

10. A method in accordance with claim 9 in which the air is transmitted through the lower channel portion downward along a corner formed between a rear wall and a side wall of the cab, and is exhausted through an opening in the floor of the cab.

11. A method in accordance with claim 9 in which the vent has movable louvers closed by gravity and opened by the air flow through the channel.

* * * * *